C. F. WICKWIRE.

CORN-POPPER.

No. 7,460. Reissued Jan. 9, 1877.

Attest:

R. A. Foster

Fred Benjamin

C. F. Wickwire by Charles E. Foster his attorney

N. PETERS, PHOTO-LITHOGRAPHER, WASHINGTON, D. C.

UNITED STATES PATENT OFFICE.

CHESTER F. WICKWIRE, OF CORTLAND, NEW YORK.

IMPROVEMENT IN CORN-POPPERS.

Specification forming part of Letters Patent No. 170,976, dated December 14, 1875; reissue No. 7,460, dated January 9, 1877; application filed December 23, 1876.

*To all whom it may concern:*

Be it known that I, CHESTER F. WICKWIRE, of Cortland, Cortland county, New York, have invented an Improved Domestic Utensil, of which the following is a specification:

My invention relates to that class of utensils in which the body or tray is made of wire cloth; and my invention consists in the mode of constructing the same, as fully described hereafter, so as to reduce the expense of manufacture, and insure greater stiffness and strength.

Figure 1:
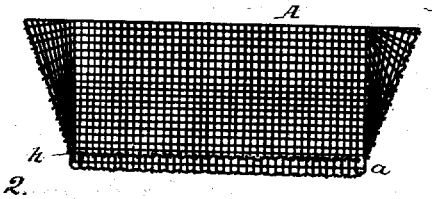
Figure 2:
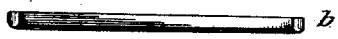
Figure 3:
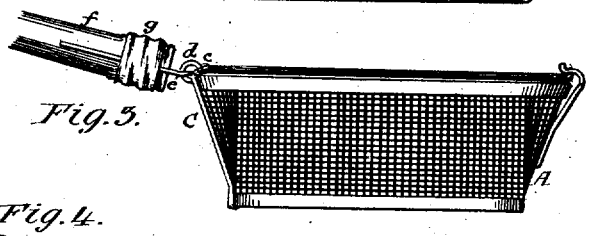
Figure 4:
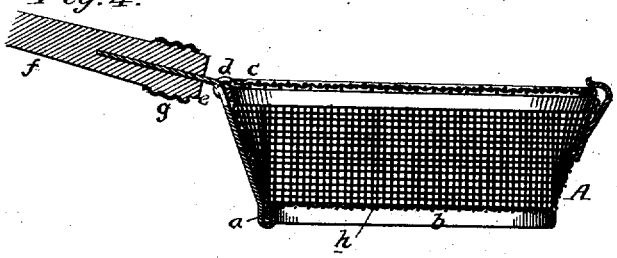
Figure 5:
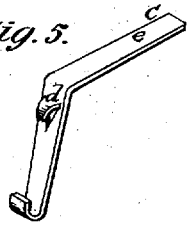

In the drawing, Figure 1 is a sectional view of the body or tray; Fig. 2, a sectional view of the binding-rim; Fig. 3, an external view of the utensil complete; Fig. 4, a longitudinal section; and Fig. 5 a detached perspective view.

In this class of utensils the body of wire-cloth has been strengthened and stiffened by means of wires only, which often interfere with the use of the article, and increase the expense of manufacture.

In order to secure the requisite stiffness, and to dispense with wires when they are objectionable, I make the body, which is oblong, square, or other suitable shape, of wire-cloth, so formed by suitable molds or dies as to make a ridge, *a*, upon the lower edge, extending down below the bottom *h*.

This ridge imparts stiffness and strength to the body, and forms a rest or support for the utensil.

To protect the rib from abrasion and wear, to which it would be subjected in many classes of utensils, as corn-poppers, and to impart further strength, a U-shaped strip of metal, *b*, is swaged or crimped upon the rib *a* along its entire length, forming a stiff, firm rim round the edge, and projecting below the bottom, protecting the latter wholly from abrasion or wear, and in most instances rendering the wire runners or braces unnecessary.

In order to connect the handle without the use of rivets, I employ a strap or plate of sheet metal, bent up at the lower end, and crimped over and clamped upon the rim, above described, at the bottom of the popper, and at the top of the popper provided with one or more hooks, *d d*, punched or cut from said strap, and being part of it, which may hook through or over the upper rim of the tray, and be bent down upon such rim to fasten and hold the upper part of said strap to the tray. The strap C is then bent backward above the lip *d*, and forms a tongue, *e*, by which to attach the handle *f*. The diameter of the handle decreases slightly for a short distance from the popper. It is slotted at the end to receive the tongue *e*, and when the ends are pressed together a sheet-metal screw-ferrule, *g*, may be slipped on and up the handle to the upper end of the slot. The ends will then expand sufficiently to retain the ferrule on the handle in transportation, and on the tongue *e* being placed in the slot, the ferrule *g* pressed or turned forward, the ends are compressed down upon the tongue, clamping it securely.

I claim—

1. In a wire-cloth domestic utensil, the wire-cloth body A, formed with a ridge, *a*, projecting down below the bottom *h*, and made by bending or crimping the wire body, as set forth.

2. The combination, with the body A and its rim *a*, of a sheet-metal strip, *b*, folded and clamped upon the rim *a*, as set forth.

3. The strap C, bent at the lower end, provided with a tongue or tongues, *d*, and combined with and applied to the body A, substantially as specified.

4. The combination of the plate C, bent to form a tongue, *e*, a wooden handle slotted to receive the tongue, and enlarged at its inner end, and a ferrule, *g*, as and for the purpose set forth.

In testimony whereof I have signed my name to this specification in the presence of two subscribing witnesses.

CHESTER F. WICKWIRE.

Witnesses:
H. M. KELLOGG,
E. F. HALBERT.